(12) United States Patent
Kokubo et al.

(10) Patent No.: US 8,579,368 B2
(45) Date of Patent: Nov. 12, 2013

(54) SEAT FOR VEHICLE

(75) Inventors: Motohiro Kokubo, Kariya (JP); Masaki Hatano, Nagoya (JP); Hideki Fujisawa, Chiryu (JP); Kazuya Iwasa, Obu (JP); Hiroaki Hayahara, Seto (JP)

(73) Assignees: Aisin Seiki Kabushiki Kaisha, Kariya-shi, Aichi-ken (JP); Toyota Boshoku Kabushiki Kaisha, Kariya-shi, Aichi-ken (JP)

( * ) Notice: Subject to any disclaimer, the term of this patent is extended or adjusted under 35 U.S.C. 154(b) by 335 days.

(21) Appl. No.: 12/859,925

(22) Filed: Aug. 20, 2010

(65) Prior Publication Data

US 2011/0043024 A1 Feb. 24, 2011

(30) Foreign Application Priority Data

Aug. 21, 2009 (JP) ................................. 2009-192016

(51) Int. Cl.
*B60N 2/48* (2006.01)
*B60N 2/12* (2006.01)
(52) U.S. Cl.
USPC .............................. 297/61; 297/316; 297/340
(58) Field of Classification Search
USPC ............ 297/378.1, 61, 362.11, 316, 330, 340
See application file for complete search history.

(56) References Cited

U.S. PATENT DOCUMENTS

| | | | | |
|---|---|---|---|---|
| 5,918,940 | A * | 7/1999 | Wakamatsu et al. | 297/410 |
| 6,192,565 | B1 * | 2/2001 | Tame | 297/61 |
| 6,974,174 | B2 * | 12/2005 | Imajo et al. | 296/65.09 |
| 7,210,734 | B1 * | 5/2007 | Yetukuri et al. | 297/61 |
| 7,258,400 | B2 * | 8/2007 | Yamada | 297/378.12 |
| 7,686,389 | B2 | 3/2010 | Yamada | |
| 8,177,279 | B2 * | 5/2012 | Wada et al. | 296/65.01 |
| 2006/0138843 | A1 * | 6/2006 | Becker et al. | 297/378.1 |
| 2008/0224518 | A1 * | 9/2008 | Yamada et al. | 297/313 |
| 2011/0101738 | A1 * | 5/2011 | Jensen | 297/61 |
| 2011/0221239 | A1 * | 9/2011 | Holdampf et al. | 297/61 |

FOREIGN PATENT DOCUMENTS

JP 2006-006720 A 1/2006
JP 2008-285025 A 11/2008

* cited by examiner

*Primary Examiner* — David Dunn
*Assistant Examiner* — Timothy J Brindley
(74) *Attorney, Agent, or Firm* — Buchanan Ingersoll & Rooney PC

(57) ABSTRACT

A seat for a vehicle includes a seat cushion frame reciprocating between seating and retracted positions, a seat back frame rotatable between standing and forward-tilted positions, a head rest movable between stationary and retracted positions, a pair of links provided at both end portions of the seat cushion frame on a floor in a lateral direction of the vehicle, a guide member including a guide groove extending between the seating and retracted positions, a slide member arranged at the seat cushion frame and sliding along the guide groove, a head rest retaining device retaining the head rest in the stationary position, a rotary member supported by the seat back frame and rotated by the slide member, and an interlocking device arranged between the rotary member and the head rest retaining device and releasing the head rest from the stationary position in accordance with a rotation of the rotary member.

5 Claims, 12 Drawing Sheets

SEAT FOR VEHICLE

CROSS REFERENCE TO RELATED APPLICATIONS

This application is based on and claims priority under 35 U.S.C. §119 to Japanese Patent Application 2009-192016, filed on Aug. 21, 2009, the entire content of which is incorporated herein by reference.

TECHNICAL FIELD

This disclosure relates to a seat for a vehicle, which includes a seat back and a seat cushion that are retracted in such a manner to be arranged in a row in a longitudinal direction of the vehicle.

BACKGROUND DISCUSSION

A known seat apparatus for a vehicle disclosed in JP2008-285025A (hereinafter referred to as Reference 1) includes a seat having a seat back that is retractable when the seat is not in use, that is, when an occupant is not seated. The seat is for example, a rear seat arranged at a rearmost portion of a station wagon, a minivan, and the like. When the seat back of the rear seat is retracted so as to tilt forward in a longitudinal direction of the vehicle, a head rest arranged at the seat back of the rear seat may interfere with a front seat. Accordingly, when retracting a seat back of a seat, a known seat retracting apparatus disclosed in JP2006-6720A (hereinafter referred to as Reference 2) retracts a head rest arranged at the seat back.

According to the seat retracting apparatus described in Reference 2, the head rest may be manually retracted by an occupant to a retracted position prior to retracting the seat back of the seat. Then, the seat back locked in a standing position is released therefrom in conjunction with the manual retracting operation of the head rest so as to be tilted forward in a longitudinal direction of the vehicle. Accordingly, the occupant may retract the head rest regardless of an angle of the seat retracting apparatus. For example, even when the seat retracting apparatus is maintained in a seating position, the occupant may retract the head rest. As a result, when the occupant unintentionally retracts the head rest, the seat back is released from the standing position, therefore deteriorating usability of the seat retracting apparatus.

A need this exists for a seat for a vehicle, which is not susceptible to the drawback mentioned above.

SUMMARY

According to an aspect of this disclosure, a seat for a vehicle includes a seat cushion frame adapted to be moved in a reciprocating manner between a seating position and a retracted position and to support a seat cushion, a seat back frame adapted to be rotated between a standing position and a forward-tilted position and to support a seat back, a head rest supported at an upper end portion of the seat back frame and movable between a stationary position and a retracted position, a pair of links provided at both end portions of the seat cushion frame in a lateral direction of the vehicle, one end of each link being adapted to be pivotably connected to a vehicle floor and the other end of each link connected to a front portion of the seat cushion frame, a guide member arranged at the vehicle floor and including a guide groove formed to extend between the seating position and the retracted position of the seat cushion frame, a slide member arranged at a rear end portion of the seat cushion frame and slidably engaging with the guide groove, a head rest retaining device retaining the head rest in the stationary position, a rotary member rotatably supported by the seat back frame and rotated by the slide member sliding along the guide groove of the guide member, and an interlocking device arranged between the rotary member and the head rest retaining device and releasing the head rest from the stationary position in accordance with a rotation of the rotary member, the head rest being retained in the stationary position by the head rest retaining device.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A seat 10 for a vehicle according to an embodiment, which includes an electric retractable seat cushion 11 will be explained with reference to illustrations of drawings as follows. The seat 10 according to the embodiment is suitable for a rear seat attached to a rearmost portion of a station wagon, a minivan, and the like. The seat 10 is arranged at an upper portion of a floor (vehicle floor) 14 of the vehicle. A whole portion of the floor 14 is formed in a flat shape.

Figure 1:
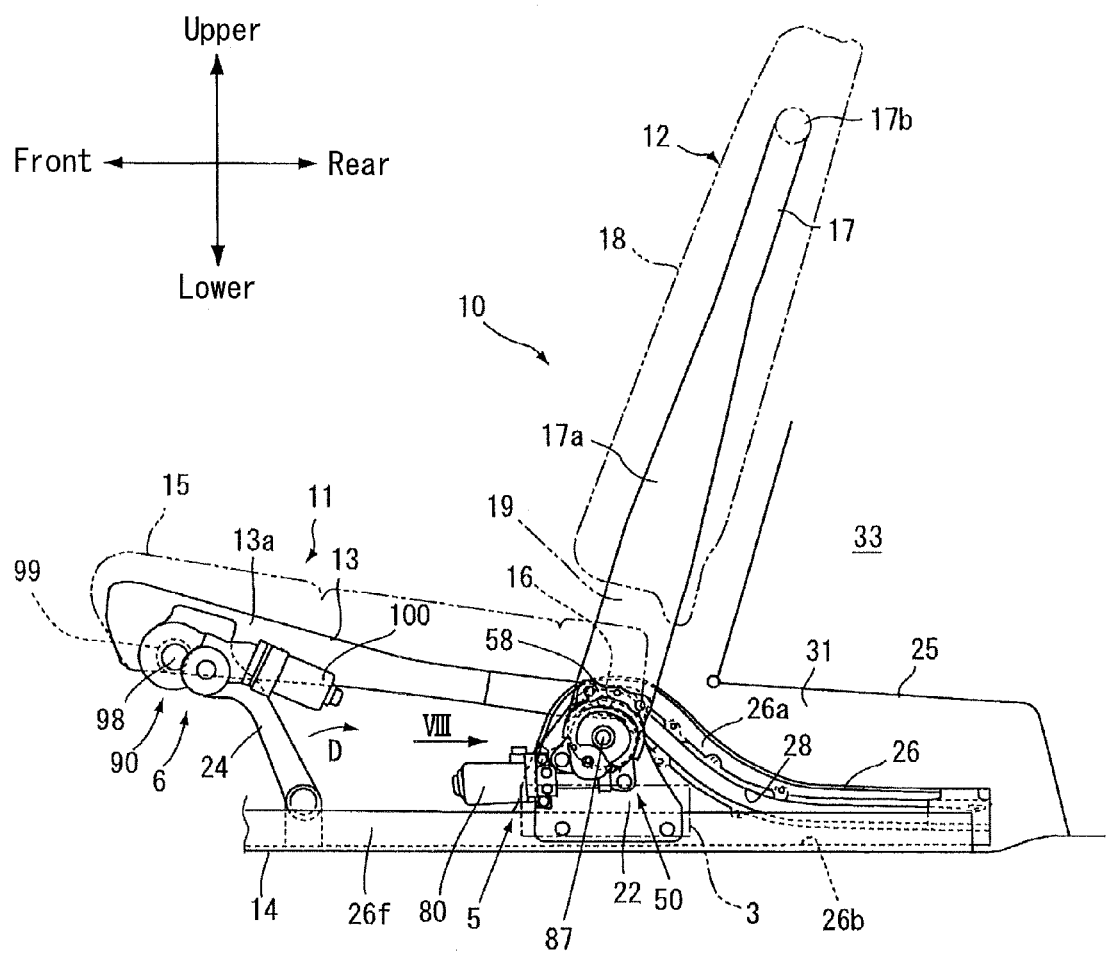
FIG. 1 is a lateral view illustrating a condition of a seat for a vehicle according to an embodiment disclosed here, when an occupant is seated.
Figure 2:
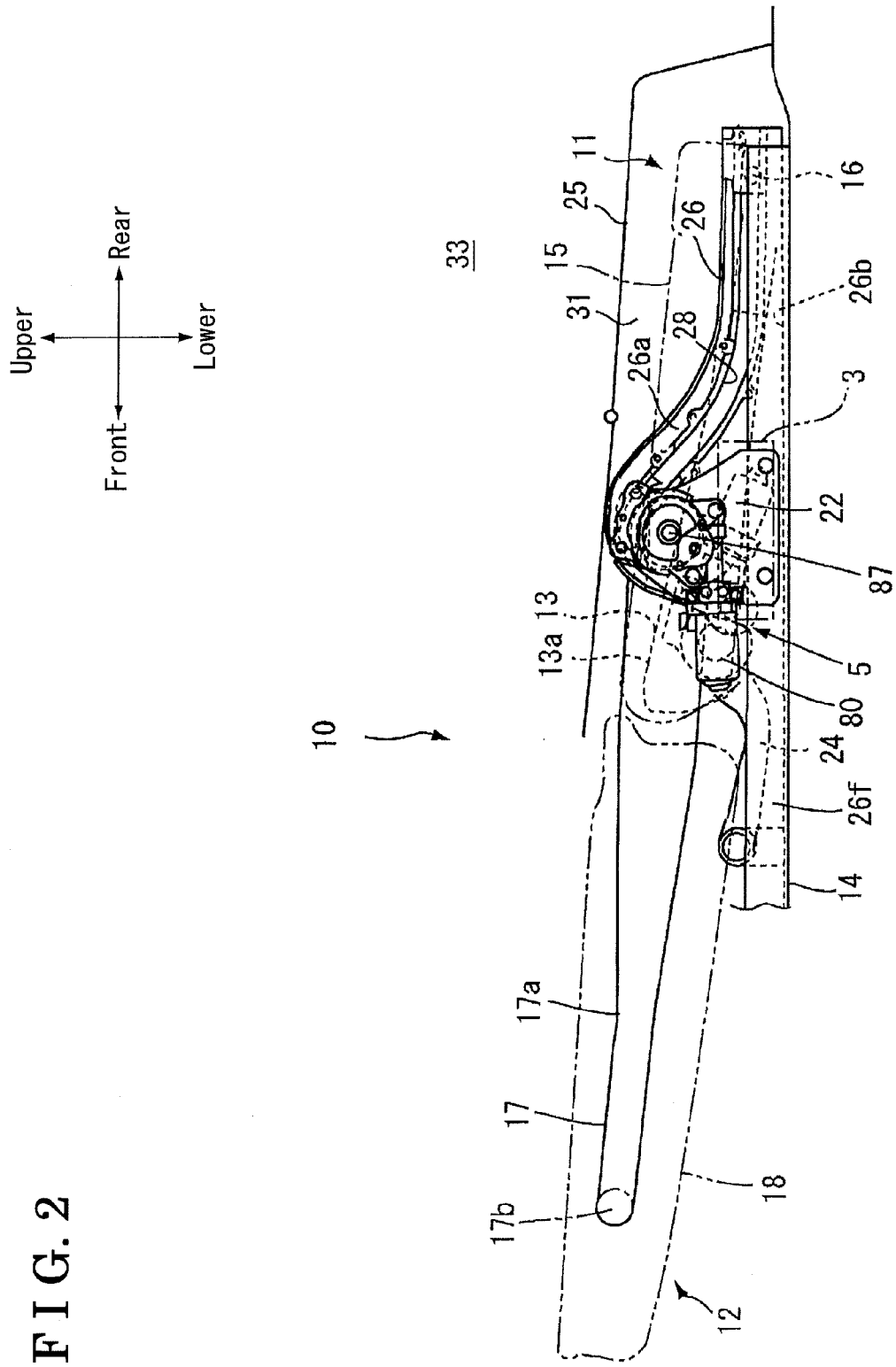
FIG. 2 is a lateral view of the seat in a retracted position.

FIG. 1 is a lateral view of the seat 10 when a seat cushion 11 and a seat back 12 of the seat 10 are arranged in a seating position and a standing position, respectively. FIG. 2 is a lateral view of the seat 10 when the seat cushion 11 and the seat back 12 are arranged in a retracted position and a forward-tilted position, respectively. Further, according to the embodiment, longitudinal, width, and vertical directions of the seat 10 correspond to a longitudinal direction (front and rear sides), a width direction (right and left sides), and a vertical direction (upper and lower sides) of the vehicle as illustrated in the attached drawings.

As shown in FIG. 1 and FIG. 2, the seat 10 includes the seat cushion 11 on which the occupant sits, the seat back 12 supporting a back of the occupant sitting on the seat cushion 11, a first drive unit 5 for the seat back 12, a second drive unit 6 for the seat cushion 11, a control unit 3 controlling operations of the first drive unit 5 and the second drive unit 6, and a rail 26 (guide member) in which a guide groove 28 is formed. The first drive unit 5 drives the seat back 12 by means of a first electric motor 80 to rotate the seat back 12 between the standing position and the forward tilted position. The second drive unit 6 drives the seat cushion 11 by means of a second electric motor 100 to reciprocate the seat cushion 11 between the seating position and the retracted position. The seat cushion 11 arranged at the upper portion of the floor 14 is guided by the guide groove 28 of the rail 26 so as to be moved therealong between the seating position and the retracted position.

The seat cushion 11 includes therein a seat cushion frame 13 that forms a framework of the seat cushion 11. The seat cushion frame 13 includes a left and right pair of extensions 13a, 13a that are provided in lateral end portions of the seat cushion 11 and are extending in the longitudinal direction. Each extension 13a is formed into a plate shape and is arranged so that a thickness direction of the extensions 13a, 13a corresponds to the lateral direction of the vehicle. A plate-like connecting member extending in the lateral direction is provided between rear end portions of the extensions 13a, 13a so as to mechanically connect the extensions 13a, 13a to each other, and thus the seat cushion frame 13 is formed into a substantial U-shape when viewed from above. Each rear end portion of the extensions 13a, 13a is provided with a slide member 16 that is formed into a cylindrical shape. The slide member 16 is located so that an axis of the cylindrical shape is substantially parallel to the lateral direction of the vehicle. A torque rod 99 is rotatably provided between front end portions of the extensions 13a, 13a so as to connect the front end portions of the extensions 13a, 13a to each other.

The seat cushion 11 includes the seat cushion frame 13, a pad mounted on a spring provided on the seat cushion frame 13, and a cover material 15 covering the seat cushion frame 13, the spring and the pad. The seat cushion 11 is driven and moved by the second drive unit 6 between the seating position shown in FIG. 1 in which the occupant may be seated on the seat cushion 11, and a retracting space 31 shown in FIG. 2, that is the retracted position.

The seat cushion frame 13 is mounted on the floor 14 by means of a pair of links 24, 24 provided on a front portion of the seat cushion frame 13. Each link 24 is made of a long plate, and a lower portion of each link 24 is pivotably connected to the floor 14 and an upper portion of each link 24 is fixedly attached to the torque rod 99 that connects the front end portions of the extensions 13a, 13a to each other.

When the seat cushion 11 is in the seating position, each link 24 is raised in a forward tilted manner so as to support the seat cushion 11 in the seating position. When the seat cushion 11 is being moved from the seating position to the retracted position, each link 24 is pivoted about a pivot portion that is connected to the floor 14. Thus, the upper portion of the link 24 is moved rearward, that is, pivoted in the arrow direction D in FIG. 1, as the seat cushion 11 moves rearward, thereby guiding a front portion of the seat cushion 11 to move rearward.

Figure 3:
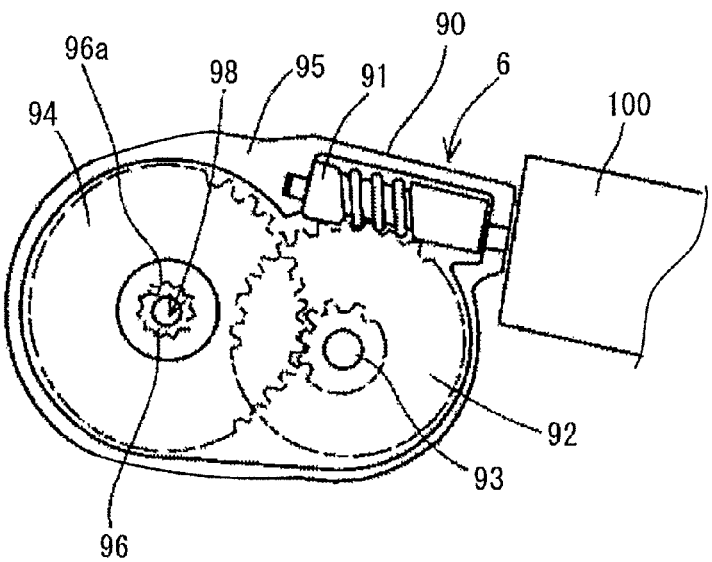
FIG. 3 is a perspective view of a gear portion of a second drive unit for a seat cushion.

The second drive unit 6 is supported by one of the extensions 13a, 13a of the seat cushion frame 13. The second drive unit 6 includes the second electric motor 100 and a gear reduction mechanism 90. As shown in FIG. 3, the gear reduction mechanism 90 includes a worm gear 91 fixedly mounted to an end portion of an output shaft of the second electric motor 100, an input gear 92 engaging with the worm gear 91, a small gear 93 that rotates coaxially and synchronously with the input gear 92, an output gear 94 which has a larger diameter than that of the small gear 93 and which engages with the small gear 93, and a housing 95 for accommodating therein the above-described gears. As shown in FIG. 3, the output gear 94 includes a spline bore 96a engaging with a spline portion 96 of a drive shaft 98. The housing 95 is fixedly fastened to the one of the extensions 13a, 13a. The drive shaft 98 is connected to the torque rod 99. The second drive unit 6 is connected to the control unit 3.

The second electric motor 100 for moving the seat cushion 11 applies a rotating torque via the drive shaft 98 to the torque rod 99 and then to the link members 24, 24, thereby rotating the torque rod 99 clockwise in FIG. 1. Consequently, the slide members 16, 16 provided on the rear end portions of the extensions 13, 13 are slid and moved rearward while being guided by the guide grooves 28, 28, and thus the seat cushion 11 is moved to the retracted position as shown in FIG. 2.

The seating position of the seat cushion 11 refers to the position that allows the occupant to be seated on the seat cushion 11. When the seat cushion 11 is in the seating position, each slide member 16 is in contact with a front end portion of the guide groove 28 and is retained in this state by the second drive unit 6, and thus the seat cushion 11 is stationary stopped. The seat cushion 11 is restricted from moving rearward and retained in the seating position by means of engagement of the gears of the second drive unit 6.

The retracted position of the seat cushion 11 refers to the position where the seat cushion 11 is retracted behind the seating position of the seat cushion 11 so as to be located in a lower position than the seating position of the seat cushion 11, that is for example, in the retracting space 31 located under a deck board 25 that forms a floor of a luggage compartment 33.

As shown in FIG. 1, the seat back 12 includes a seat back frame 17 that forms a framework of the seat back 12. The seat back frame 17 includes a left and right pair of side portions 17a, 17a that are provided in lateral end portions of the seat back 12 and are extending in the vertical direction. Each side portion 17a is formed into a plate shape and is arranged so that a thickness direction of the side portion 17a corresponds to the lateral direction of the vehicle. A pipe-like connecting member 17b is provided between upper end portions of the side portions 17a, 17a so as to mechanically connect the side portions 17a, 17a to each other in the lateral direction, and thus the seat back frame 17 is formed into a substantial U-shape having an opening downward when viewed from the front. Each lower portion of the side portions 17a, 17a is disposed between a connecting plate 22 and the guide wall member 26a, and is pivotably connected to the connecting plate 22 via a shaft 87.

A seat reclining unit 50 is located on an outer side (the left side in this embodiment) of a connecting part where one of the connecting plates 22, 22 and the lower portion of the related side portion 17a are connected with each other. The seat reclining unit 50 is connected to the shaft 87, and supported by the connecting plate 22 and by the side portion 17a of the seat back frame 17. The seat reclining unit 50 adjusts a reclining angle of the seat back 12 relative to the seat cushion 11. The seat reclining unit 50 includes the first drive unit 5 driven by the first electric motor 80. The first drive unit 5 is located on the outer side of the seat reclining unit 50. The first drive unit 5 is connected to the control unit 3.

Figure 4:
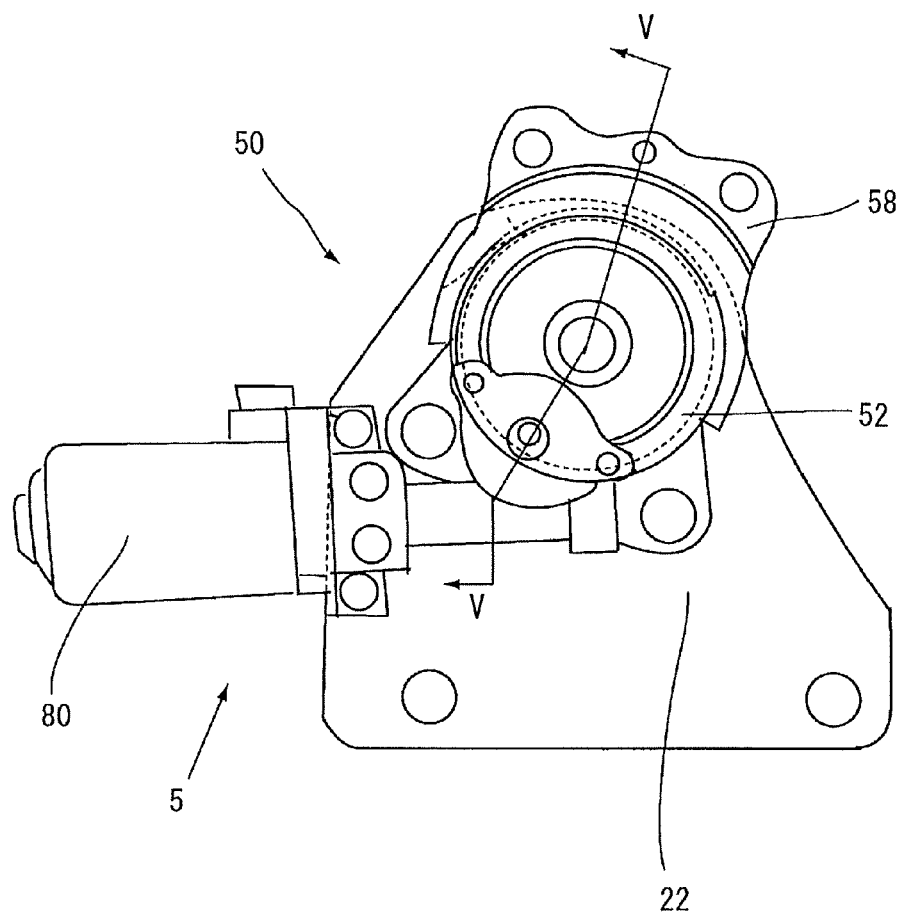
FIG. 4 is an enlarged view of a first drive unit for a seat back.
Figure 5:
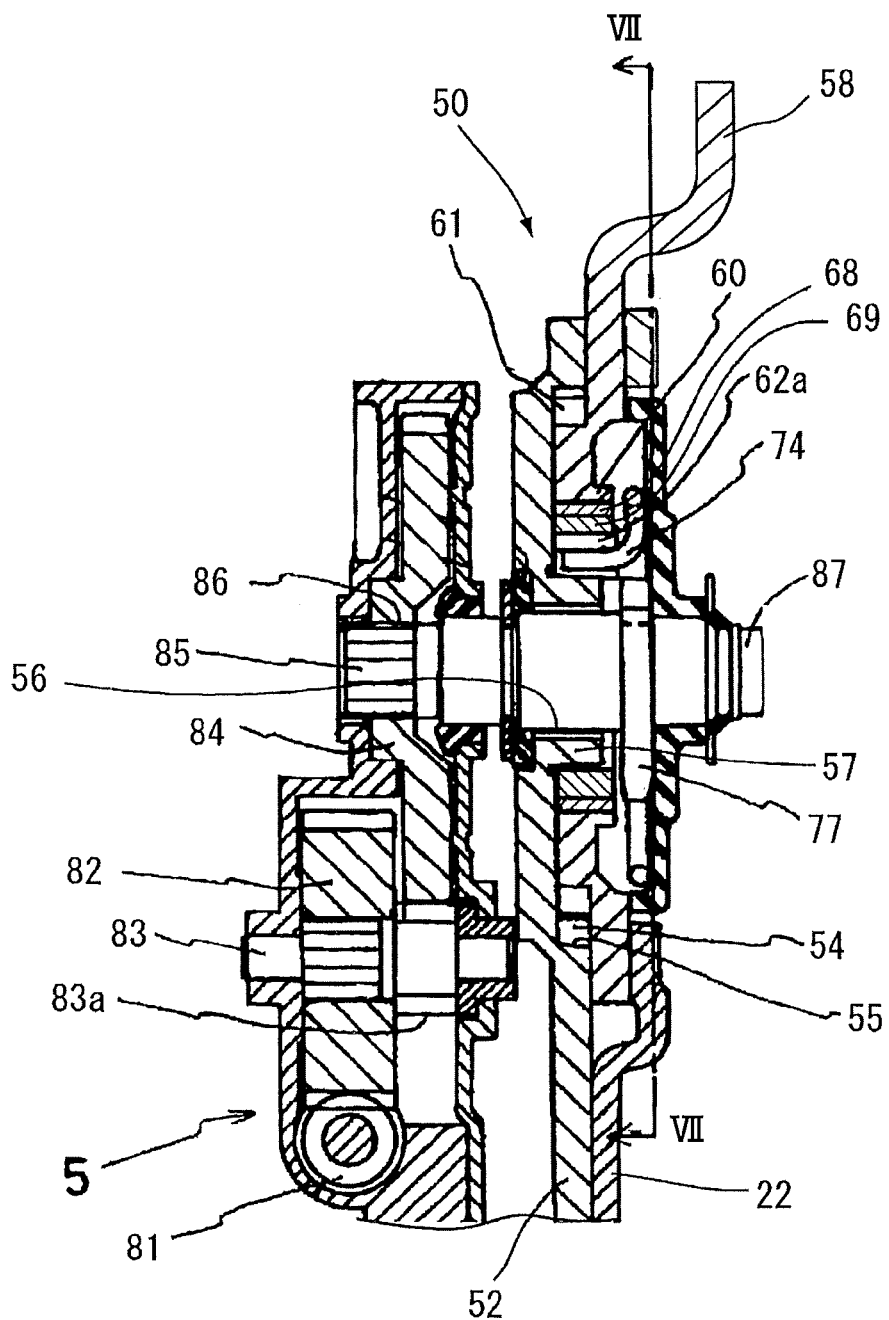
FIG. 5 is a cross-sectional view taken along the line V-V of FIG. 4.
Figure 6:
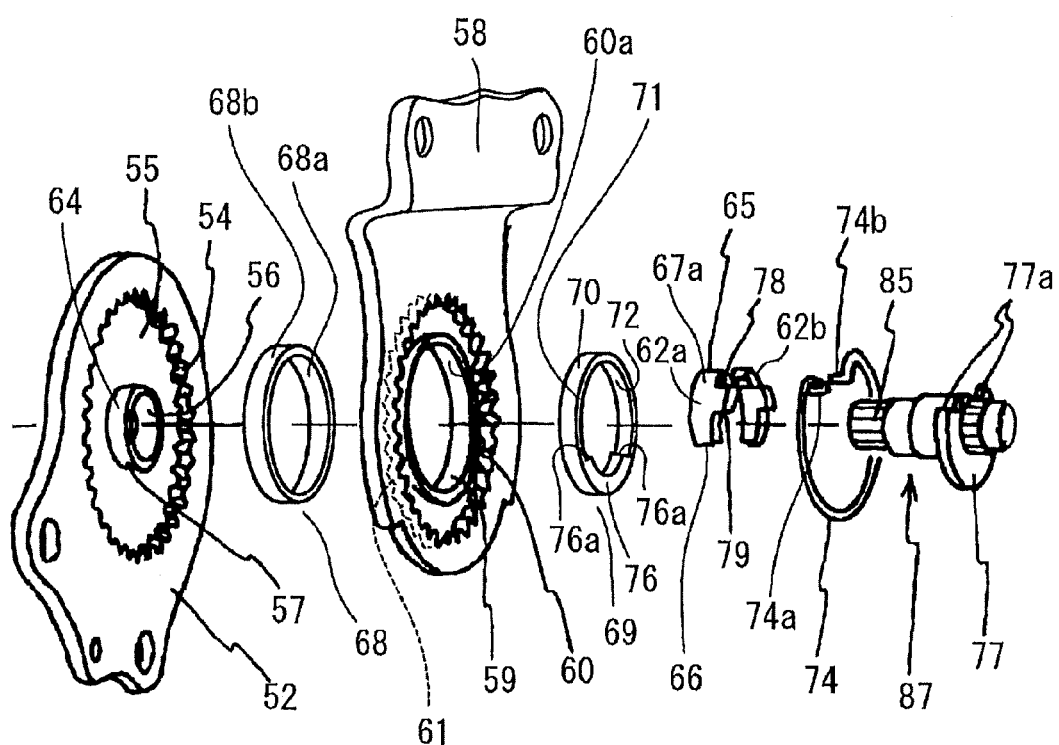
FIG. 6 is an exploded perspective view of a seat reclining unit for the seat back.

The seat reclining unit 50 and the first drive unit 5 will be described below. As shown in FIGS. 4 and 5, a gear plate 52 of the seat reclining unit 50 is fixedly secured to the connecting plate 22. As shown in FIGS. 5 and 6, the gear plate 52 includes in a substantial center thereof a space 55 formed by a half blanking process. The space 55 is recessed relative to the remaining plain surface of the gear plate 52 and is provided with an internal gear 54 formed on an inner circumferential surface of the space 55. The space 55 includes a shaft hole 56 formed in the radial center of the space 55. The shaft hole 56 is provided with a burring 57 formed on a circumference of the shaft hole 56 so as to project in a direction that the space 55 opens.

An upper arm 58 of the seat reclining unit 50 is fixedly secured to the one of the frame 17a. As shown in FIGS. 5 and 6, the upper arm 58 includes in a substantial center thereof a protrusion of a circular shape formed by the half blanking process so as to protrude from the remaining plain surface of the upper arm 58. An external gear 61 is provided on an outer circumferential surface of the protrusion. A portion of teeth of the external gear 61 of the upper arm 58 are engaged with a portion of teeth of the internal gear 54 of the gear plate 52. The number of teeth of the external gear 61 is set to be slightly less than the number of teeth of the internal gear 54. The upper arm 58 includes a pivot shaft hole 59 formed in the center of the protrusion formed on the upper arm 58. The pivot shaft hole 59 is provided with a burring 60 formed on a circumference of the pivot shaft hole 59 so as to project in an opposite direction to the direction that the protrusion protrudes. A press-fit ring 68 is press-fitted in the pivot shaft hole 59 so that a shape of an inner circumferential surface 60a of the burring 60 and a shape of an outer circumferential surface 68b of the press-fit ring 68 are approximately the same. The press-fit ring 68 is integrally secured to the upper arm 58.

Figure 7:
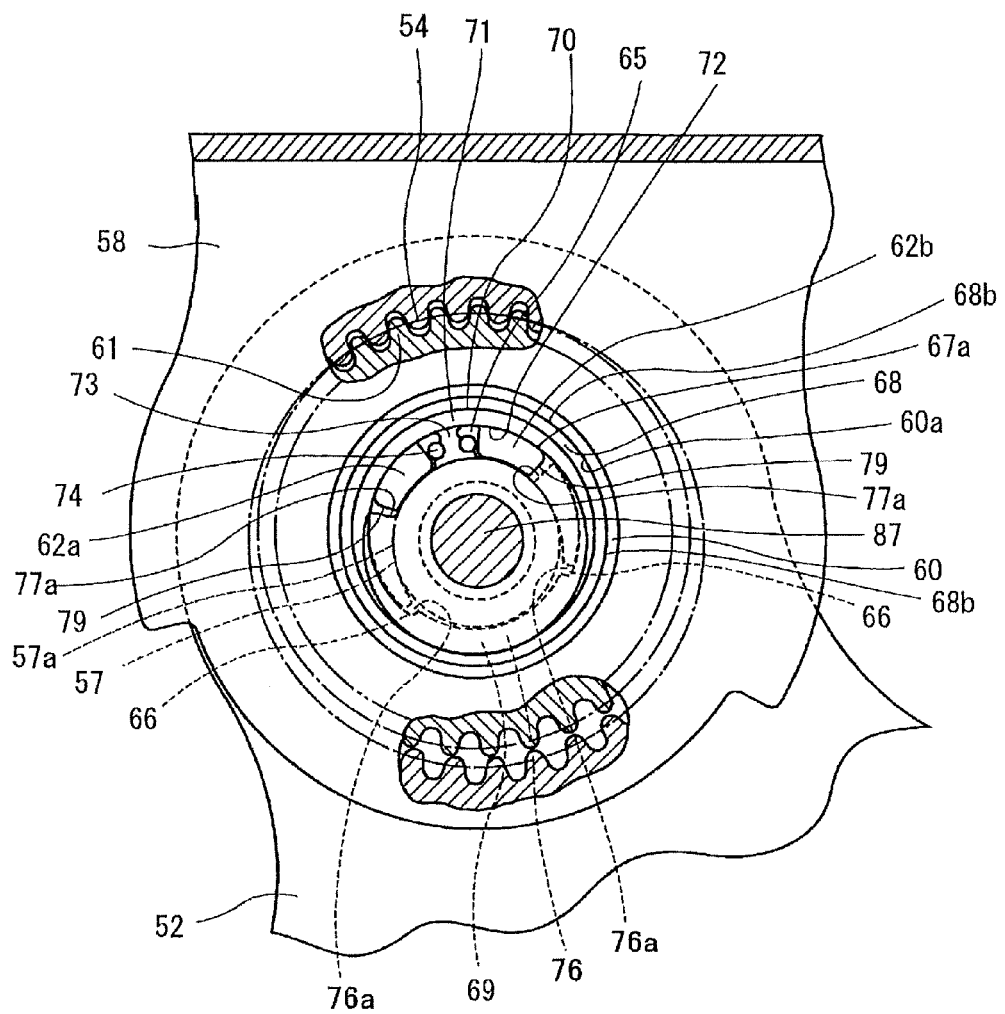
FIG. 7 is a cross-sectional view taken along the line VII-VII of FIG. 5.

An engagement of the internal gear 54 and the external gear 61 is retained by a pair of wedge members 62a, 62b. The pair of wedge members 62a, 62b is formed by two symmetric portions each having a substantial arc shape. The pair of wedge members 62a, 62b is disposed in a radial space formed between an outer circumferential surface 64 of the burring 57 and an inner circumferential surface 68a of the press-fit ring 68. The burring 57 is formed on the gear plate 52 so as to be concentric with the internal gear 54. The press-fit ring 68 is formed and press-fitted in the pivot shaft hole 59 so as to be eccentric with the outer circumferential surface 64 of the burring 57 and concentric with the external gear 61. The pair of wedge members 62a, 62b is arranged so as to leave a circumferential space 73 (see FIG. 7) between one circumferential end of the wedge member 62a and one circumferential end of the wedge member 62b. A radial thickness of each of the wedge members 62a, 62b increases toward the circumferential space 73. Thus, each of the wedge members 62a, 62b has a thick circumferential end portion 65 that is located closer to the circumferential space 73, and a thin circumferential end portion 66 that is located on the other circumferential end. The pair of wedge members 62a, 62b is formed into the arc shape so that an inner circumferential surface of each of the wedge members 62a, 62b slidably contacts with the outer circumferential surface 64 of the burring 57 formed on the gear plate 52, and so that an outer circumferential surface 67a of each of the wedge members 62a, 62b slidably contacts with the inner circumferential surface 68a of the press-fit ring 68. The outer circumferential surface 67a of each of the wedge members 62a, 62b serves as a friction surface and has the same shape as an inner circumferential surface 72 of a radially narrow portion 71 of a ring member 69. A radial clearance is formed between the inner circumferential surface of each of the wedge members 62a, 62b and the burring 57. The radial clearance becomes smaller toward the thick circumferential end portion 65. Thus, the inner circumferential surface of each of the wedge members 62a, 62b is in contact with the burring 57 in the vicinity of the thick circumferential end portion 65. The pair of wedge members 62a, 62b is arranged so as to cover a substantially half of the outer circumferential surface 64 of the burring 57 in the circumferential direction, leaving the circumferential space 73 between the wedge members 62a, 62b. In the circumferential space 73, a spring 74 is disposed so as to expand the circumferential space 73 in the circumferential direction. One end 74a of the spring 74 is in contact against the thick circumferential end portion 65 of the wedge member 62a and the other end 74b of the spring 74 is in contact against the thick circumferential end portion 65 of the wedge member 62b.

As shown in FIGS. 5 and 6, the ring member 69 made of metal is provided on the outer circumferential surface 67a of the wedge members 62a, 62b. The ring member 69 includes the radially narrow portion 71, and a radially wide portion 76 formed into a fan shape or a sector shape that inwardly extends beyond the radially narrow portion 71 in the radial direction. The outer circumferential surface 70 of the ring member 69 forms a cylindrical slide contact surface that is slidable along the inner circumferential surface 68a of the press-fit ring 68, and is concentric with the inner circumferential surface 68a of the press-fit ring 68. The radially narrow portion 71 has a uniform thickness along the circumferential direction, that is, the inner circumferential surface 72 and the outer circumferential surface 70 are concentric with each other. The inner circumferential surface 72 of the radially narrow portion 71 is formed so as to contact along the outer circumferential surface 67a of the wedge members 62a, 62b. Each of end faces 76a, 76a of the radially wide portion 76 come in contact with each of the thin circumferential end portions 66, 66 of the wedge members 62a, 62b.

As shown in FIGS. 5 and 6, the shaft 87 is rotatably inserted in the shaft hole 56 formed on the gear plate 52. A cam 77 is provided on an end portion of the shaft 87, and is formed into a flat disk shape having a fan-shaped notch. The fan-shaped notch is formed by cutting off a portion of the circumference of the flat disk so that the fan-shaped notched portion opens outward in the radial direction. A protrusion 78 is formed on an axial end face of each of the wedge members 62a, 62b so as to protrude in the axial direction beyond the burring 60 of the upper arm 58 and an axial end surface of the press-fit ring 68. When the shaft 87 rotates in one direction, a circumferential end face 77a formed on the cam 77 comes in contact with a circumferential end face 79 of the protrusion 78 of either one of the wedge members 62a and 62b, for example the wedge member 62a. Thus, the wedge member 62a is moved in the circumferential direction against the spring force of the spring 74, thereby decreasing the circumferential space 73 in the circumferential direction. When the shaft 87 rotates in the other direction, the other one of the wedge members 62a, 62b is moved, thereby decreasing the circumferential space 73 in a similar way.

Consequently, a frictional engagement between the outer circumferential surface 67a of the wedge members 62a, 62b and the inner circumferential surface 72 of the ring member 69 is released, which allows a position of the engagement between the internal gear 54 and the external gear 61 to shift. When the shaft 87 further rotates, the circumferential space 73 between the thick circumferential end portions 65, 65 of the wedge members 62a, 62b is further decreased. While the circumferential space 73 is maintained in a decreased state, the wedge members 62a, 62b are rotated about a rotation axis of the shaft 87 in the same direction as the shaft 87 rotates. The center of the ring 69 is located to be eccentric with respect to the rotation axis of the shaft 87 because of the pair of wedge members 62a, 62b, whose radial thickness is circumferentially uneven. Consequently, as the pair of wedge members 62a, 62b is rotated about the shaft 87, the ring member 69 orbits around the rotation axis of the shaft 87. The internal gear 54 formed on the gear plate 52 is concentric with the burring 57 that is also formed on the gear plate 52, and the center of the internal gear 54 lies on the rotation axis of the shaft 87.

Further, as the pair of wedge members 62a, 62b, whose radial thickness is circumferentially uneven, exists between the press-fit ring 68 and the burring 57, the center of the internal gear 54 formed on the gear plate 52 is eccentric with respect to the center of the external gear 61 formed on the upper arm 58. Consequently, as the ring member 69 orbits around the rotation axis of the shaft 87, the external gear 61 formed on the upper arm 68 rotates with respect to the internal gear 54 formed on the gear plate 52. Thus, the position of the engagement between the internal gear 54 and the external gear 61 shifts.

Then, the thin circumferential end portion 66 of the wedge member 62b comes in contact with one of the end faces 76a, 76a of the ring member 69. As the pair of wedge members 62a, 62b is further rotated, the wedge member 62b, which is being moved by the wedge member 62a and being in contact with the one of the end faces 76a, 76a, pushes the ring member 69 in the circumferential direction. The ring member 69, together with the pair of wedge members 62a, 62b, starts rotating relative to the burring 57 of the gear plate 52. When the ring member 69 is rotated, the outer circumferential surface 70 of the ring member 69 slides in the circumferential direction along the inner circumferential surface 68a of the press-fit ring 68 that is integrally secured to the upper arm 58. Consequently, the external gear 61 eccentrically rotates with respect to the axis of the internal gear 54. Thus, the position of the engagement between the internal gear 54 and the external gear 61 shifts. Every time the shaft 87 completes one rotation, the upper arm 68 pivots relative to the gear plate 52 by an angle that corresponds to a difference in the number of teeth between the external gear 61 and the internal gear 54. As a result, the reclining angle of the seat back 12 relative to the seat cushion 11 fixedly mounted on the floor 14 is adjusted.

As illustrated in FIG. 5, The first drive unit 5 is fixedly attached to the connecting plate 22. The first drive unit 5 includes the first electric motor 80 serving as a drive source of the first drive unit 5, and a gear reduction mechanism that includes a worm gear 81, a worm wheel 82, a pinion gear 83 and a gear 84. The first drive unit 5 transmits a rotation produced by the first electric motor 80 to the gear 84, the gear functioning at the final phase of the reduction mechanism. The gear 84 includes in the center thereof a serration 86 that engages with a serrated portion 85 formed on the shaft 87. The first electric motor 80 rotates the shaft 87 in the normal direction and the reverse direction when the occupant operates a switch. When the first electric motor 80 rotates in one direction, a rotation torque is transmitted to the shaft 87 through the gear reduction mechanism.

The seat back 12 includes the seat back frame 17, a back pad that may be elastically deformed by a load applied thereto via a back mat, and a cover material 18 covering the seat back frame 17, the back pad and the back mat. As illustrated in FIG. 1, a recess 19 is formed on a lower end portion of the back pad so as to prevent the seat cushion 11 from interfering with the seat back 12 when the seat cushion 11 is moved between the seating position and the retracted position.

The standing position of the seat back 12, as described above, refers to the position of the seat back 12 that allows the occupant to be seated on the seat cushion 11 and allows the seat back 12 to support a back of the occupant. The standing position of the seat back 12 includes any reclining positions that the occupant may select when seated. The forward-tilted position of the seat back 12 refers to the position of the seat back 12 when it is arranged forward to the seat cushion 11 that is in the retracted position.

As described above, the first drive unit 5 and the second drive unit 6 are controlled by the control unit 3 so that the seat cushion 11 and the seat back 12 are moved at an optimal timing between the seating position and the retracted position, and between the standing position and the forward-tilted position, respectively.

The pair of rails 26, 26 serving as the pair of guide members is provided for fastening the seat cushion 11 to the floor 14 and is extending from the lateral sides of the retracting space 31 to the vicinity of the pair of links 24, 24. Each of the rails 26, 26 is provided with a guide wall member 26a that is formed into a long plate shape and is extending in the longitudinal direction. When the seat cushion 11 is in the retracted position, the guide wall member 26a faces the lateral portion of the seat cushion 11.

Figure 8:
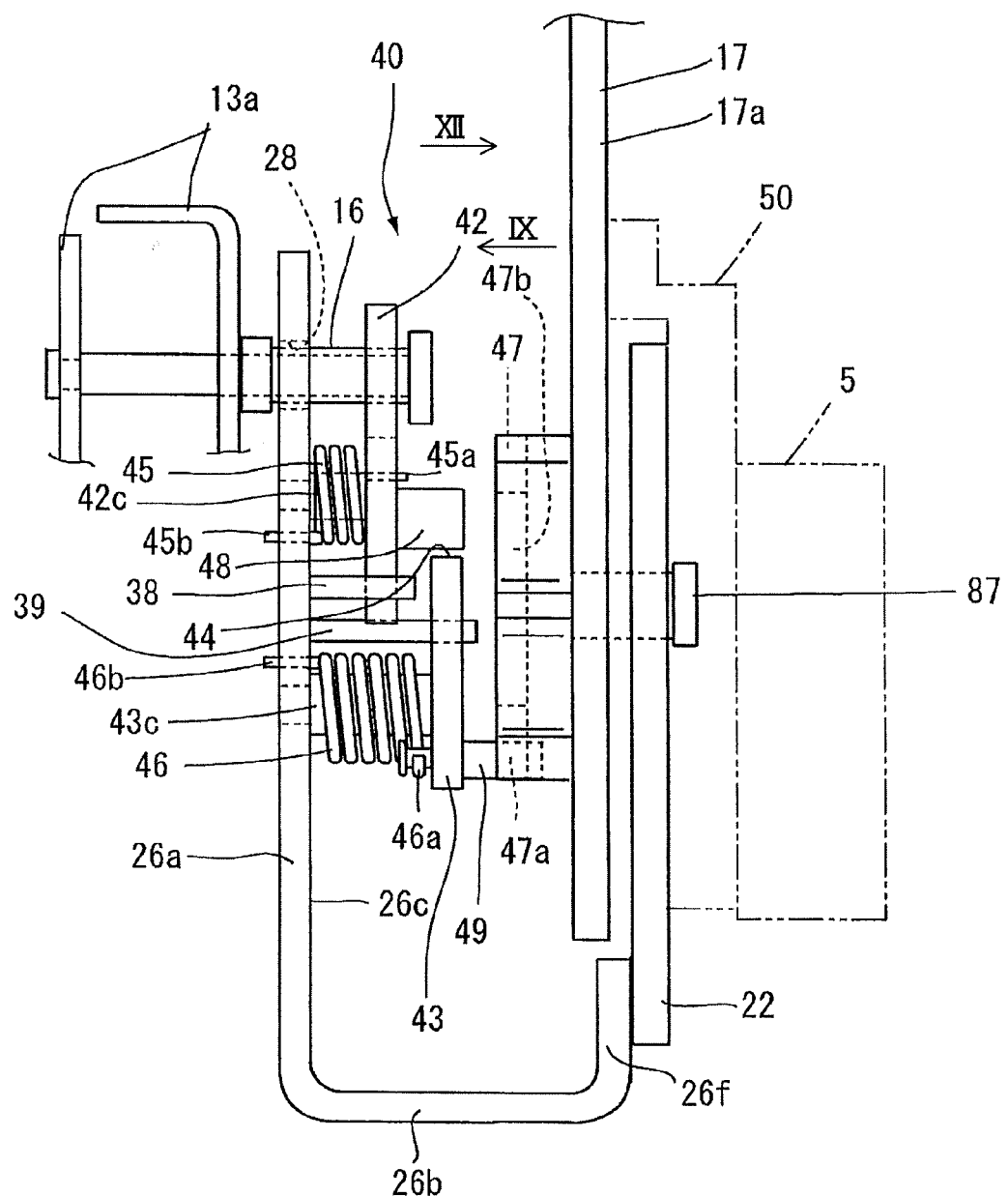
FIG. 8 is a view seen from an arrow VIII of FIG. 1.

As shown in FIG. 8, a fastening portion 26b is formed on a lower end portion of each guide wall member 26a so as to extend away from the seat cushion 11 in the lateral direction of the vehicle. The fastening portions 26b, 26b are fastened to the floor 14 by means of fasteners, and thus the rails 26, 26 are securely fastened to the floor 14.

A connecting portion 26f having a long plate shape is formed on a lateral end face of each fastening portion 26b so as to extend upward. A lower end portion of the connecting plate 22, which is formed into a plate shape, is fixedly fastened to each connecting portion 26f so that the connecting plate 22 and the connecting portion 26f are attached to each other in a thickness direction. The connecting plates 22, 22 allow the seat back 12 to be supported by the floor 14. The connecting plates 22, 22 are arranged along the longitudinal direction of the seat 10 so as to face the guide wall members 26, 26, respectively.

Each guide wall member 26a is provided with the guide groove 28 (that is, a long hole). The guide groove 28 is formed by fitting a resin member into the long hole on the guide wall member 26a for improving a frictional performance, a sliding performance and so forth. The guide groove 28 includes a moderate slope portion located in a front end of the guide groove 28, a horizontal portion located in a rear portion of the guide groove 28, and a slope portion located between the moderate slope portion and the horizontal portion. The horizontal portion is located near the floor 14 so as to extend substantially horizontally to the floor 14. The moderate slope portion is located to be higher than the horizontal portion and moderately slopes downwardly relative to the floor 14 toward the rear direction. The slope portion slopes downwardly toward the rear direction. Each of the slide members 16, 16 that are formed into the cylindrical shape and provided on left and right rear end portions of the seat cushion frame 13 engages with the guide groove 28 of each guide wall member 26a in a manner that the slide member 16 is allowed to move and restricted from moving in the guide groove 28. Thus, a rear end portion of the seat cushion 11 is connected to the floor 14 via the pair of rails 26, 26. The rear end portion of the seat cushion 11 is guided in a direction of movement of the seat cushion 11 as the slide members 16, 16 move along the guide grooves, 28, 28. That is, the guide grooves 28, 28 define a movement locus of the seat cushion 11 between the seating position and the retracted position.

As illustrated in FIG. 8, a lock mechanism 40 according to this disclosure is provided on a flat plane 26c that is located in a lower portion of the front end of the guide wall member 26a formed on the guide groove 28. The lock mechanism 40 is provided on each lateral side of the seat cushion 11. When an excessive load is applied to the seat cushion 11 in the seating position, the lock mechanism 40 locks the seat cushion 11 in the seating position, and restricts the seat cushion 11 from moving rearward. When the seat cushion 11 needs to be moved from the seating position to the retracted position, the lock mechanism 40 unlocks the seat cushion 11 so as to allow it to move to the retracted position.

Figure 9:
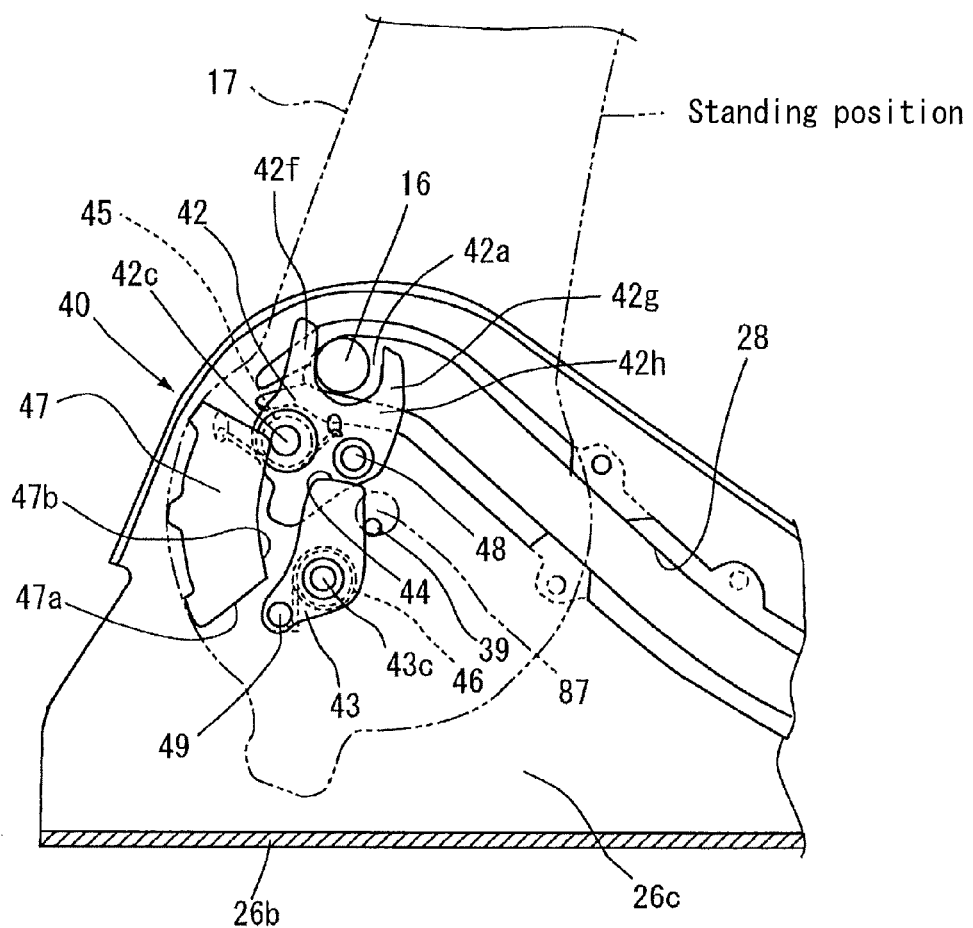
FIG. 9 is a view of a lock mechanism seen from an arrow IX of FIG. 8.

As shown in FIGS. 8 and 9, the lock mechanism 40 includes a latch 42 pivotably supported on the flat plane 26c by a pivot shaft 42c, a latch engagement member 48 formed integrally with the latch 42 on a flat plane 42h of the latch 42 so as to protrude away from the seat cushion 11, and a latch biasing member 45. The latch biasing member 45 is a torsion coil spring that biases the latch 42 to rotate in a direction from a locked position to an unlocked position (a clockwise direction as shown in FIG. 9).

Figure 13:
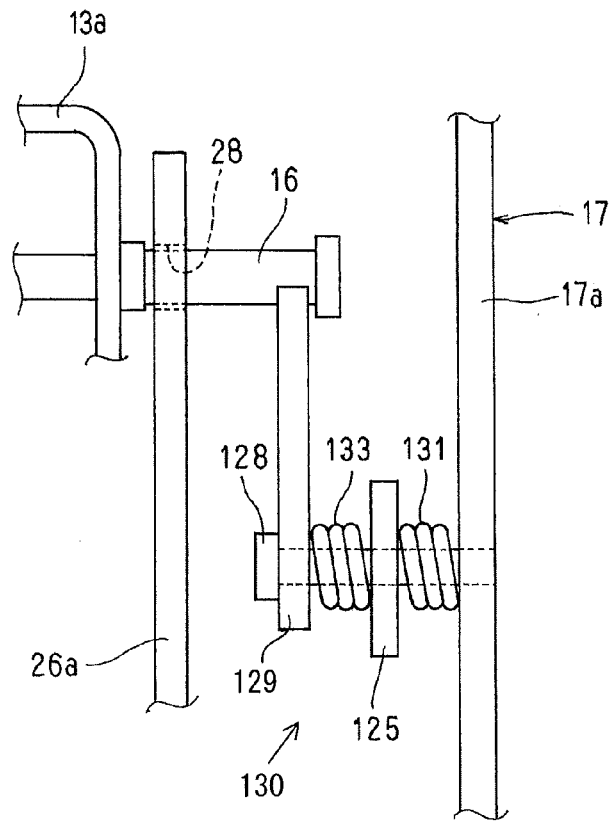
FIG. 13 is a cross-sectional view taken along the line XIII-XIII of FIG. 12.

The locked position of the latch 42 refers to the position of the latch 42 when the seat cushion 11 is in the seating position as shown in FIG. 9. The unlocked position of the latch 42 refers to the position of the latch 42 when the seat cushion 11 is allowed to move to the retracted position as shown in FIG. 13. In the unlocked position, an engagement opening portion 42a of the latch 42 is opened in a direction of a rear end portion of the guide groove 28.

The lock mechanism 40 also includes a pawl 43 pivotably supported at the flat plane 26c below the latch 42 by a pivot shaft 43c, a restricting portion 44 that is formed on an outer circumferential portion of the pawl 43 and that faces an outer circumferential surface of the latch engagement member 48 allowing a slight clearance between the restricting portion 44 and the outer circumferential surface of the latch engagement member 48 when the seat cushion 11 is in the seating position, a pawl engagement member 49 formed integrally with the pawl 43 so as to protrude away from the seat cushion 11, and a pawl biasing member 46. The pawl biasing member 46 is a torsion coil spring that biases the pawl 43 to rotate in a direction from a released position to a restricted position.

Figure 14:
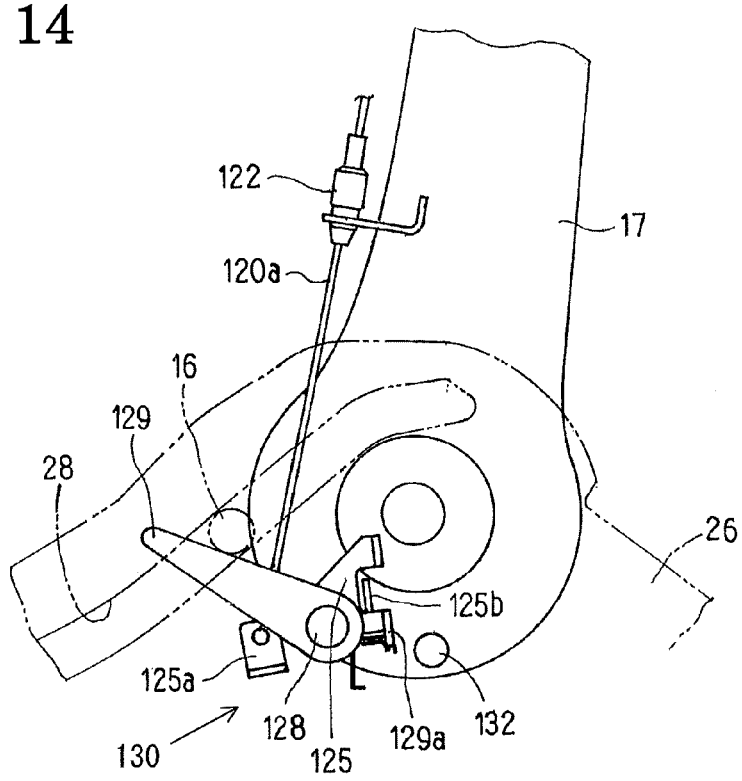
FIG. 14 is a view illustrating an operating state of the rotary member illustrated in FIG. 12.

The restricted position of the pawl 43 refers to the position of the pawl 43 when the latch 42 is in the locked position. The released position of the pawl 3 refers to the position of the pawl 43 as shown in FIG. 14 when the seat cushion 11 is being moved from the seating position to the retracted position or is in the retracted position, and the latch 42 is being moved from the locked position to the unlocked position or is in the unlocked position.

As shown in FIGS. 8 and 9, the lock mechanism 40 also includes a releasing member 47 that is integrally provided on the seat back frame 17. When the seat back frame 17 moves from the standing position to the forward-tilted position, the releasing member 47 pushes an outer circumferential surface of the pawl engagement member 49 so that the pawl 43 is pivoted from the restricted position to the released position, and retains the pawl 43 in the released position.

Next, the lock mechanism 40 will be described in details below. The latch 42 of the lock mechanism 40 is a plate-like member having a predetermined rigidity and is made of, for example, iron or the like. As shown in FIG. 9, the latch 42 includes the engagement opening portion 42a that engages with and disengages from the slide member 16 which moves in the longitudinal direction in the guide groove 28. The engagement opening portion 42a is formed by two protrusions 42f, 42g each provided forward to the engagement opening portion 42a and behind the engagement opening portion 42a with respect to the vehicle's longitudinal direction. The protrusion 42f is formed so as to protrude away from the center of the pivot shaft 42c of the latch 42 by a predetermined length. The protrusion 42g is formed to be substantially parallel to the protrusion 42f so that the two protrusions 42f, 42g provide a space in which the slide member 16 is received and engaged. As described above, the latch engagement member 48 is formed on the flat plane 42h of the latch 42 so as to axially protrude away from the seat cushion 11. The latch engagement member 48 protrudes slightly beyond the pawl 43 that is located axially away from the latch 42.

The latch biasing member 45 of the latch 42 is the torsion coil spring where the coil is wound clockwise in a direction from the front side to the reverse side of the paper on which the FIG. 9 is drawn. One end of the latch biasing member 45, which serves as a locking portion 45a, is bent and fastened into a locking hole provided on the latch 42. The other end of the latch biasing member 45, which serves as a locking portion 45b, is bent and fastened into a locking hole provided on the guide wall member 26a. Thus, the latch biasing member 45 biases the latch 42 to rotate about the pivot shaft 42c clockwise. The latch 42 is provided with a stopper member 38 for stopping the latch 42 from pivoting clockwise, that is, in a direction of the unlocked position. In this embodiment, a pin fastened to the guide wall member 26a serves as the stopper member 38, however, any types of the stopper member that stops the latch 42 from pivoting may be used.

The pawl 43 is arranged parallel to the latch 42 in a manner that the latch 42 is located between the pawl 43 and the seat cushion 11 with respect to the lateral direction of the seat cushion 11. A distance between the pawl 43 and the latch 42 causes no interference therebetween, and at the same time, the distance causes the latch engagement member 48 of the latch 42 and the restricting portion 44 of the pawl 43 to contact with each other when each of the pawl 43 and the latch 42 is pivoted.

When the excessive load is applied to the seat cushion 11, the pawl 43 in the restricted position receives the load via the slide member 16 provided on the seat cushion 11 and via the engagement portion 48 of the latch 42 in the locked position, and restricts the latch 42 from pivoting in the direction to the unlocked position. In other words, the pawl 43 restricts the seat cushion 11 from moving rearward. Therefore, the pawl 43 is the plate-like member having the high rigidity and is made of, for example, iron or the like. The pivot shaft 43c, which pivotably supports the pawl 43, is located below and behind the pivot shaft 42c of the latch 42. The latch 42 and the pawl 43 are arranged so that a first line and a second line forms a substantially right angle when the latch engagement member 48 and the restricting portion 44 of the pawl 43 face and contact with each other. The first line connects the center of the pivot shaft 42c of the latch 42 with a position where the latch engagement member 48 and the restricting portion 44 face each other (that is, a vicinity of the center of the latch engagement member 48), and the second line connects the center of the pivot shaft 43c of the pawl 43 with the position where the latch engagement member 48 and the restricting portion 44 face each other (that is, the vicinity of the center of the latch engagement member 48).

The pawl 43 is provided with the pawl biasing member 46 whose axis line corresponds to the pivot shaft 43c of the pawl 43. The pawl biasing member 46 is the torsion coil spring where the coil is wound clockwise in the direction from the front side to the reverse side of the paper on which the FIG. 9 is drawn. One end of the pawl biasing member 46, which serves as a locking portion 46a, is bent and fastened to a stopper pin provided on a lateral surface, which faces the seat cushion 11, of the pawl 43. The other end of the pawl biasing member 46, which serves as a locking portion 46b, is bent and fastened into a notch hole formed on the flat plane 26c of the guide rail member 26a. Thus, the pawl biasing member 46 biases the pawl 43 to pivot about the pivot shaft 43c clockwise from the released position to the restricted position. The pawl 43 is provided with a stopper member 39 for stopping the pawl 43 from pivoting in the clockwise direction in FIG. 9, that is, in a direction of the restricted position.

When the seat cushion 11 is unlocked, the releasing member 47 pivots in the counterclockwise direction in FIG. 9 as the side portion 17a pivots to tilt forward. The releasing member 47 includes an engagement surface 47a and a curved retaining surface 47b. The engagement surface 47a is set to be long enough in the radial direction to push the outer circumferential surface of the pawl engagement member 49 of the pawl 43 that is in the restricted position when the seat cushion 11 is being unlocked. When the pawl 43 is in the released position after passing through the restricted position, the curved retaining surface 47b retains the pawl engagement member 49 in place so that the pawl 43 stays in the released position.

When the seat back frame 17 is in the standing position, the releasing member 47 is located forward to the pivot center of the side portion 17a of the seat back frame 17. The releasing member 47 has a shape that is formed by cutting a circumferential portion away from a ring whose center corresponds to the pivot center of the side portion 17a. The releasing member 47 refers to a portion of an outer periphery of the side portion 17a, which extends toward the seat cushion 11 at a right angle and then extends toward the pivot center of the seat back frame 17 so as to be in contact with the outer circumferential surface of the pawl engagement member 49 of the pawl 43.

In the lock mechanism 40 having the above described configuration, the latch 42, where the slide member 16 engages with the engagement opening portion 42a opening upward, is located above the pawl 43. Further, the latch 42, the pawl 43 and the releasing member 47 are arranged in a manner that at least two of the latch 42, the pawl 43 and the releasing member 47 are partly overlapped with each other in the lateral direction of the vehicle when at least one of the latch 42, the pawl 43 and the releasing member 47 is pivoting, and when none of the latch 42, the pawl 43 and the releasing member 47 is pivoting.

An unlocking operation of the lock mechanism 40 configured as described above, for releasing the seat cushion 11 from the seating position is performed by the tilt forward movement of the seat back frame 17 driven by the drive unit 5. That is, the engagement surface 47a of the releasing member 47 is rotated about the pivot center of the seat back 12 by the forward tilting movement of the seat back frame 17, thereafter making contact with the pawl engagement member 49 of the pawl 43. Accordingly, the pawl 43 is rotated around the pivot shaft 43c to the released position. Then, the seat back 12 is further tilted forward; thereafter, the restriction portion 44 of the pawl 43 is moved to the unlocked position in which the restriction portion 44 is disengaged from the latch engagement member 48 of the latch 42. The latch 42 is rotated by a predetermined angle in accordance with the rearward movement of the slide member 16 of the seat cushion frame 13 until the restriction portion 44 is moved to the unlocked position. Then, when the seat cushion frame 13 is further moved rearward, the latch 42 is moved to the unlocked position shown in FIG. 10. When the latch 42 is in the unlocked position, the engagement opening portion 42a is opened toward the retracted position of the guide groove 28 to release the seat cushion 11 from the seating position.

Figure 10:
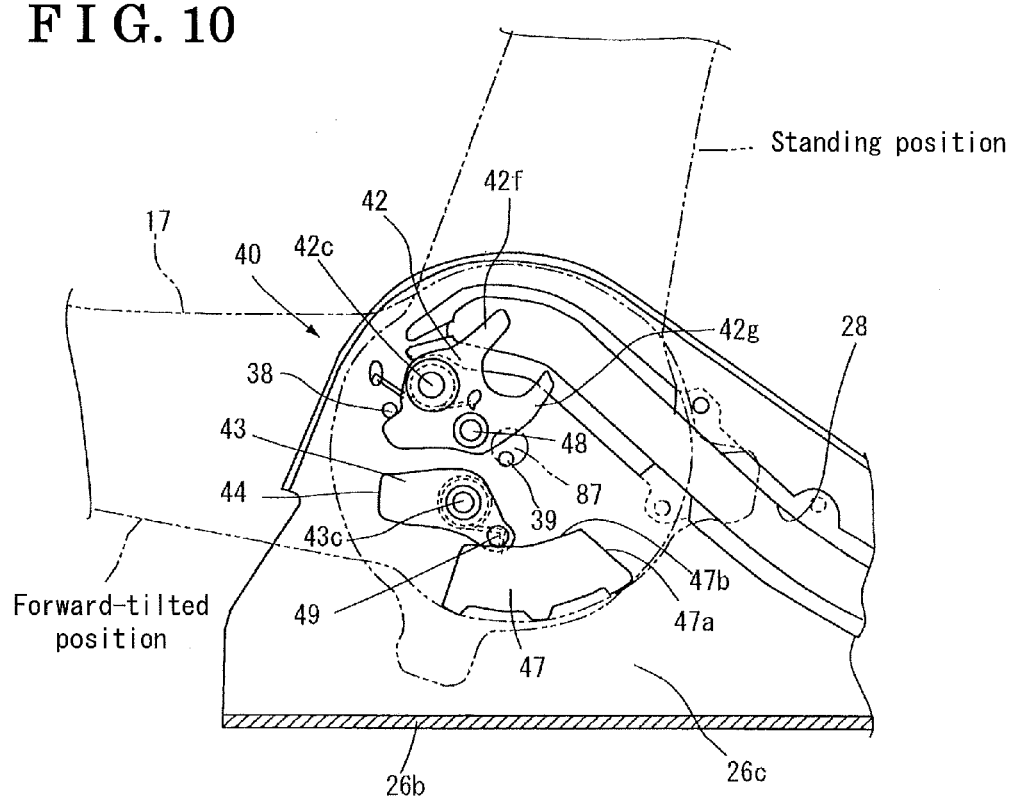
FIG. 10 is a view illustrating an operating state of the lock mechanism.

A locking operation of the lock mechanism 40 for locking the seat cushion 11 in the seating position is performed in conjunction with the tilt-up movement of the seat back 12 from the forward-tilted position to the standing position. When the seat back 12 is tilted up from the forward-tilted position to the standing position, the releasing member 47 is rotated about the shaft 87 of the seat back 12 clockwise as seen in FIG. 10; thereby, the pawl engagement member 49 of the pawl 43, pressing the curved retaining surface 47b of the releasing member 47 disengages from the curved retaining surface 47b and thereafter engages with the engagement surface 47a.

Then, the releasing member 47 is further rotated clockwise to rotate the pawl 43 clockwise toward the restricted position; thereafter, the latch engagement member 48 of the latch 42 engages with a side wall of the pawl 43, which is perpendicular to the restriction portion 44 of the pawl 43. Afterward, when the pawl 43 is further rotated toward the restricted position, the latch engagement member 48 of the latch 42 passes over an unlock starting point (the unlock point) and thereafter is moved upon the restriction portion 44 of the pawl 43, therefore locking the seat cushion 11 in the seating position. At this time, the slide member 16 is inserted into and engaged with the engagement opening portion 42a that is opened toward the retracted position of the latch 42, in accordance with a forward movement of the seat cushion 11 before the latch 42 is moved to the locked position. Then, the latch 42 returns to the locked position shown in FIG. 9.

A configuration in which a head rest 110 attached to an upper end portion of the seat back 12 is moved to a retracted position in accordance with the movement of the seat cushion 11 in the longitudinal direction will be explained as follows.

Figure 11:
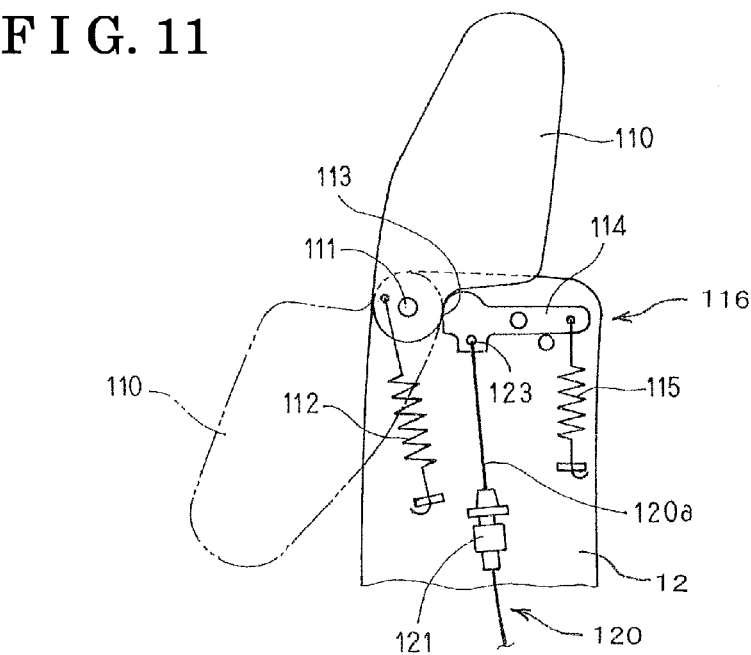
FIG. 11 is a view illustrating an attached state of a head rest relative to the seat back.

As illustrated in FIG. 11, the head rest 110 is attached to the upper end portion of the seat back 12. A lower portion of the head rest 110 is supported by a pivot shaft 111 so as to tilt in the longitudinal direction. Further, the head rest 110 is tilted in the longitudinal direction in conjunction with the rearward movement of the seat cushion 11 as will be described below. Further, when the seat back 12 is retracted, the head rest 110 is retained in the retracted position and prevented from interfering with a front seat of the vehicle.

A tensile spring 112 is arranged between the head rest 110 and the seat back 12. The head rest 110 is biased by a biasing force of the tensile spring 112 in a direction to consistently retract the head rest 110. An engagement portion 113 is arranged at a lower end portion of the head rest 110. A restriction cam 114 rotatably supported by the seat back 12 is configured to be engageable with and disengageable from the engagement portion 113 of the head rest 110. The restriction cam 114 is biased by a biasing force of a spring 115 in a direction to allow the restriction cam 114 to engage with the engagement portion 113. The head rest 110 is consistently retained in a stationary position by the engagement between the restriction cam 114 and the engagement portion 113. Further, the restriction cam 114 is rotated by an interlocking cable 120 which will be described below, against the biasing force of the spring 115; thereby the engagement between the restriction cam 114 and the engagement portion 113 is released to tilt the head rest 110 to the retracted position by means of the biasing force of the tensile spring 112 accordingly.

A head rest retaining device 116 is configured by the restriction cam 114 that is engageable with the engagement portion 113 of the head rest 110 and the spring 115 that biases the restriction cam 114 in the direction to allow the restriction cam 114 to engage with the engagement portion 113.

Figure 12:
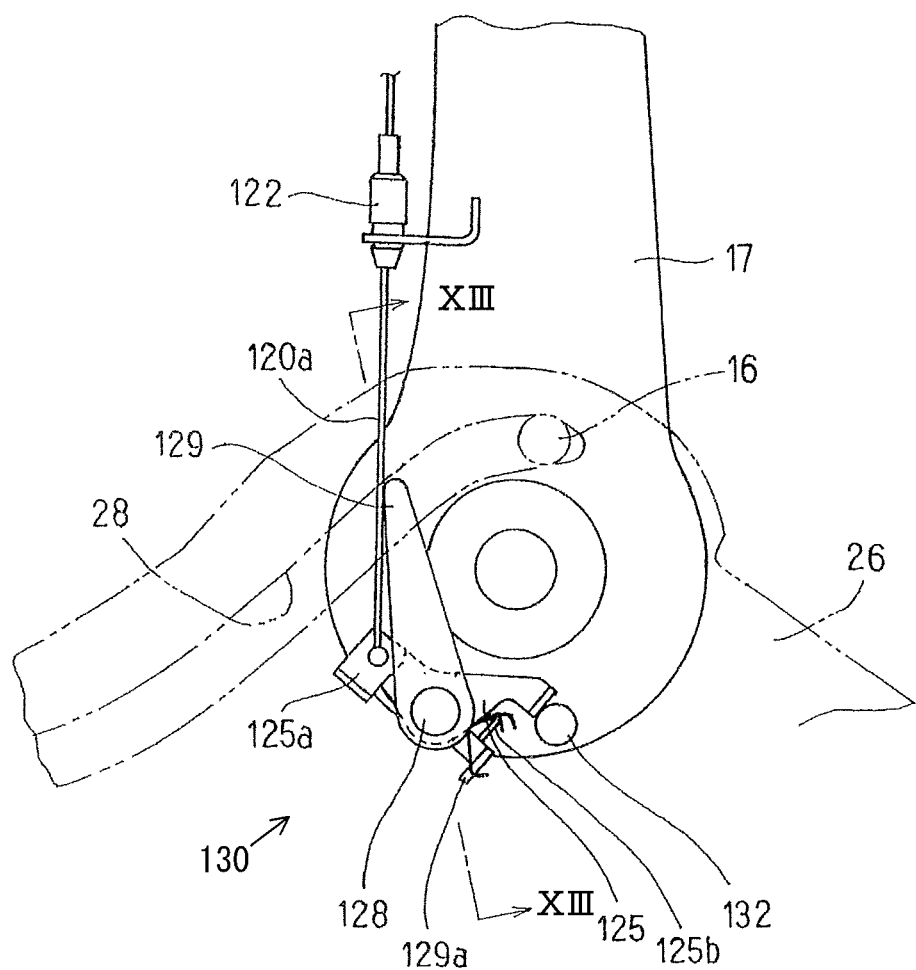
FIG. 12 is a view of a rotary member seen from an arrow XII of FIG. 8.

The interlocking cable 120 serving as an interlocking device is arranged at the seat back 12. The interlocking cable 120 allows the head rest 110 to tilt in the longitudinal direction in conjunction with the movement of the seat cushion 11. As shown in FIG. 11, a first cable end 121 of the interlocking cable 120 is fixed to the upper end portion of the seat back 12 under the head rest 110. Meanwhile, as illustrated in FIG. 12, a second cable end 122 of the interlocking cable 120 is fixed to a lower end portion of the seat back 12 above the seat reclining unit 50. One end portion of an internal wire 120a of the interlocking cable 120, i.e. a first end portion protruding from the first cable end 121 is connected to a wire connecting portion 123 of the restriction cam 114 configuring a portion of the head rest retaining device 116. Meanwhile, the other end portion of the internal wire 120a, i.e. a second end portion protruding from the second cable end 122 is connected to a wire connecting portion 125a formed at an operating arm 125 for operating the interlocking cable 120. The operating arm 125 is pivotably supported by the seat back 12.

As illustrated in FIG. 12, a supporting shaft 128 is attached to the seat back frame 17 so as to be located approximately below the pivot center of the seat back 12 (the seat reclining unit 50). A central portion of the operating arm 125 and one end portion of a pivot link 129 that overlap each other are pivotably supported by the supporting shaft 128 about an axis line of the supporting shaft 128. That is, the operating arm 125 and the pivot link 129 are arranged coaxially with each other. The axis line of the supporting shaft 128 is in parallel with the pivot center of the seat back 12. Alternatively, the supporting shaft 128 may be attached to a connecting arm fixed to the seat back frame 17.

As shown in FIG. 13, the operating arm 125 is rotated clockwise (in one direction as seen in FIG. 12) about the supporting shaft 128 by a biasing force of a first torsion spring 131 arranged between the side portion 17a of the seat back frame 17 and the operating arm 125 and serving as a first biasing member. Under a normal condition, a first end portion of the operating arm 125 is retained in an angular position in which the first end portion is in contact with a stopper shaft 132 attached to the seat back frame 17. The wire connecting portion 125a is formed at a second end portion of the operating arm 125. In the condition where the operating arm 125 is retained in the angular position in which the first end is in contact with the stopper shaft 132, the internal wire 120a is reeled out from the second cable end 122 to retain the head rest 110 in the stationary position.

Furthermore, as shown in FIG. 13, the pivot link 129 is rotated counterclockwise (in the other direction as seen in FIG. 12) around the supporting shaft 128 by a biasing force of a second torsion spring 133 arranged between the operating arm 125 and the pivot link 129 and serving as a second biasing member. Under the normal condition, a protruding portion 129a formed at a lower end portion of the pivot link 129 is retained in an angular position (initial position) in which the protruding portion 129a is in contact with a stopper portion 125b formed at the operating arm 125. At this time, the biasing force of the first torsion spring 131 acting on the operating arm 125 is set to be larger than the biasing force of the second torsion spring 133. Accordingly, under the normal condition, the operating arm 125 is retained in the initial position in which the operating arm 125 is in contact with the stopper shaft 132 at the same time as the protruding portion 129a of the pivot link 129 is in contact with the stopper portion 125b of the operating arm 125.

An upper end portion of the pivot link 129 extends upward when the operating arm 125 is retained in the initial position. Further, at this time, the upper end portion of the pivot link 129 extends to an area where the upper end portion is in contact with the slide member 16 of the seat cushion fame 13, slidably engaging with the guide groove 28 of the rail 26. Thus, when the seat cushion frame 13 is moved rearward at the time of retracting the seat cushion 11, the pivot link 129 is rotated counterclockwise about the supporting shaft 128 in accordance with the movement of the slide member 16, as seen in FIG. 12. When the pivot link 129 is rotated counterclockwise, the operating arm 125 having the stopper portion 125b that is in contact with the protruding portion 129a of the pivot link 129 is integrally rotated counterclockwise with the pivot link 129 against the biasing force of the first torsion spring 131. The operating arm 125 and the pivot link 129 configure a rotary member 130. The operating arm 125 and the pivot link 129 forming the rotary member 130 are integrally rotated with each other or the pivot link 129 is rotated relative to the operating arm 125 by the slide member 16 of the seat cushion frame 13.

Figure 15:
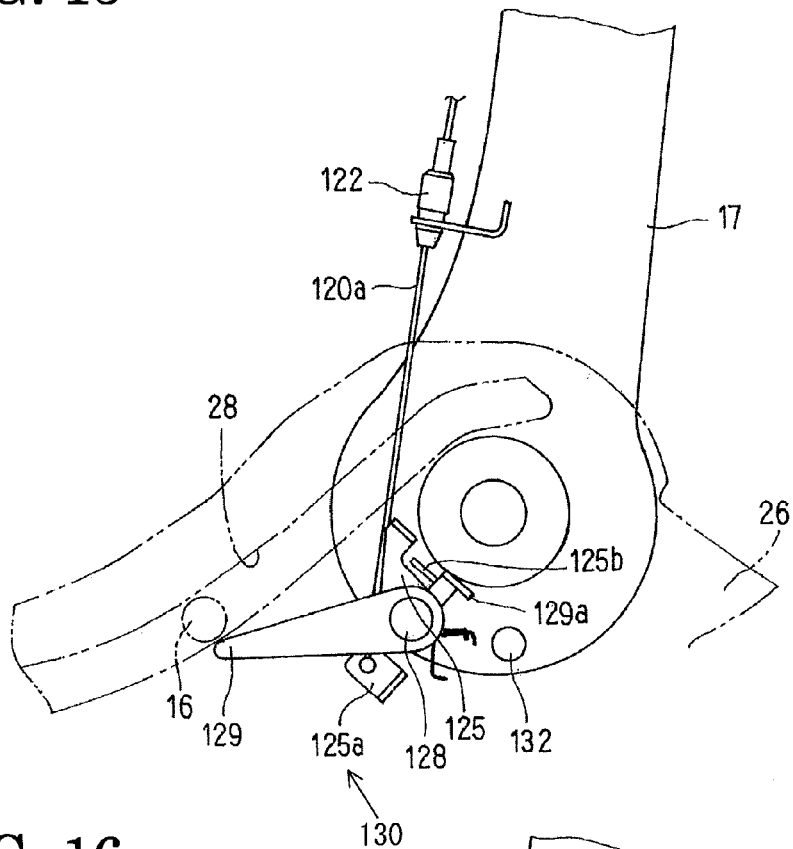
FIG. 15 is a view illustrating an operating state of the rotary member illustrated in FIG. 12.

As illustrated in FIG. 15, the wire connecting portion 125a is moved downward in accordance with the counterclockwise rotation of the operating arm 125; therefore, the second end portion of the internal cable 120a protruding from the second cable end 122 is pulled downward. Accordingly, the restriction cam 114 configuring the portion of the head rest retaining device 116 that is connected to the first end portion of the internal cable 120a is rotated against the biasing force of the spring 115; therefore, the engagement between the restriction cam 114 and the engagement portion 113 of the head rest 110 is released. Consequently, the head rest 110 is rotated counterclockwise about the pivot shaft 111 by means of the biasing force of the tensile spring 112, as seen in FIG. 11. As a result, the head rest 110 is retracted in a front side of the seat back 12.

The pivot link 129 rotated by the rearward movement of the slide member 16 is configured to keep in contact with the slide member 16 while the slide member 16 slides by a predetermined distance along the guide groove 28. In other words, a pivot center (the supporting shaft 128) of the pivot link 129 is set to be positioned so that the upper end portion of the pivot link 129 may slide along the guide groove 28 by keeping in contact therewith while the pivot link 129 rotates by a predetermined angle.

Further, when the pivot link 129 rotates by the predetermined angle in accordance with the rearward movement of the slide member 16; thereafter, the pivot link 129 is separated from the slide member 16 and the pivot link 129 and the operating arm 125 are returned to the initial position by the biasing force of the first torsion spring 131. When being returned to the initial position, the operating arm 125 is brought in contact with the stopper shaft 132.

A retracting operation of the seat 10 will be explained as follows. The occupant operates a retraction operating switch under the condition where the seat cushion 11 is in the seating position; thereafter, the control unit 3 drives the second electric motor 100 of the drive unit 6 driving the seat cushion 11. Then, the seat cushion 11 starts moving from the seating position to the retracted position.

The slide member 16 arranged at the rear end portion of the seat cushion frame 13 is moved rearward along the guide groove 28 formed at the rail 26, in accordance with the movement of the seat cushion 11 to the retracted position. Then, the rear end portion of the seat cushion frame 13 is moved downward toward the floor 14.

The slide member 16 provided at the rear end portion of the seat cushion frame 13 is moved by the predetermined distance along the guide groove 28; therefore, the slide member 16 makes contact with a front surface of the pivot link 129 supported by the seat back frame 17 to integrally rotate the pivot link 129 counterclockwise with the operating arm 125 against the biasing force of the first torsion spring 131, as seen in FIG. 14. The second end portion of the internal wire 120a of the interlocking cable 120 connected to the operating arm 125 is pulled downward by the counterclockwise rotation of the operating arm 125.

When the internal wire 120a is pulled downward by a predetermined distance, the restriction cam 114 is rotated against the biasing force of the spring 115 and is disengaged from the engagement portion 113 of the head rest 110. As a result, the head rest 110 retained in the stationary position by the head rest retaining device 116 is released; therefore, the head rest 110 is tilted forward by the biasing force of the spring 112 and thereafter is retained in the retracted position.

In addition, the pivot link 129 is rotated by the predetermined angle in accordance with the rearward movement of the slide member 16 to thereby shift the slide member 16 further rearward from a condition shown in FIG. 14. At this time, as shown in FIG. 15, the pivot link 129 is separated from the slide member 16 and the pivot link 129 is rotated clockwise about the supporting shaft 128 integrally with the operating arm 125 that is rotated clockwise by the biasing force of the first torsion spring 131. Then, the operating arm 125 is returned to the initial position (a condition shown in FIG. 12) in which the first end portion of the operating arm 125 is in contact with the stopper shaft 132.

The first electric motor 80 for the drive unit 5 driving the seat back 12 is driven slightly after the seat cushion 11 is moved toward the retracted position. Then, a lock mechanism of the seat reclining unit 50 is operated and the seat back 12 starts to be rotated from the standing position to the forward-tilted position.

The seat back 12 rotated as described above is shifted from the standing position to the forward-tilted position in which the seat back 12 is arranged at a further forward side than the seat cushion 11 moved to the retracted position in the longitudinal direction. When the seat back 12 is tilted forward, the head rest 110 attached to the upper end portion of the seat back 12 is retained in the retracted position. Accordingly, the head rest 110 may be prevented from interfering with the front seat when the seat back frame 17 is retracted.

As describe above, when the slide member 16 arranged at the seat cushion frame 13 is moved rearward to the retracted position in which the slide member 16 engages with the rear end portion of the guide groove 28 and when the seat back 12 is rotated by the predetermined angle, the link 24 is completely tilted down to the floor 14 and the cushion frame 13 is retained in the retracted position in which the cushion frame 13 is in parallel with the floor 14. Then, the seat back 12 and the seat cushion 11 are approximately flatly arranged and retracted in a row in the longitudinal direction as illustrated in FIG. 2.

In addition, retraction start timing of the seat 10 and driving speeds of the first and second electric motors 80 and 100 are adjusted by the control unit 3 at the timing of the retracting operation of the seat 10 in order to prevent the seat back 12 and the seat cushion 11 from interfering with each other.

When the occupant operates a return switch in order to return the seat cushion 11 from the retracted position to the seating position and to return the seat back 12 from the forward-tilted position to the standing position, the first and second electric motors 80 and 100 are to reversely rotate, thereby tilting up the seat back 12 from forward-tilted position to the standing position and rotating the link 24 counterclockwise in FIG. 1. Accordingly, the slide member 16 is moved forward along the guide groove 28 of the rail 26, therefore moving the seat cushion 11 from the retracted position to the seating position and rotating the seat back 12 from the forward-tilted position to the standing position so that the interference between the seat cushion 11 and the seat back 12 is prevented.

Figure 16:
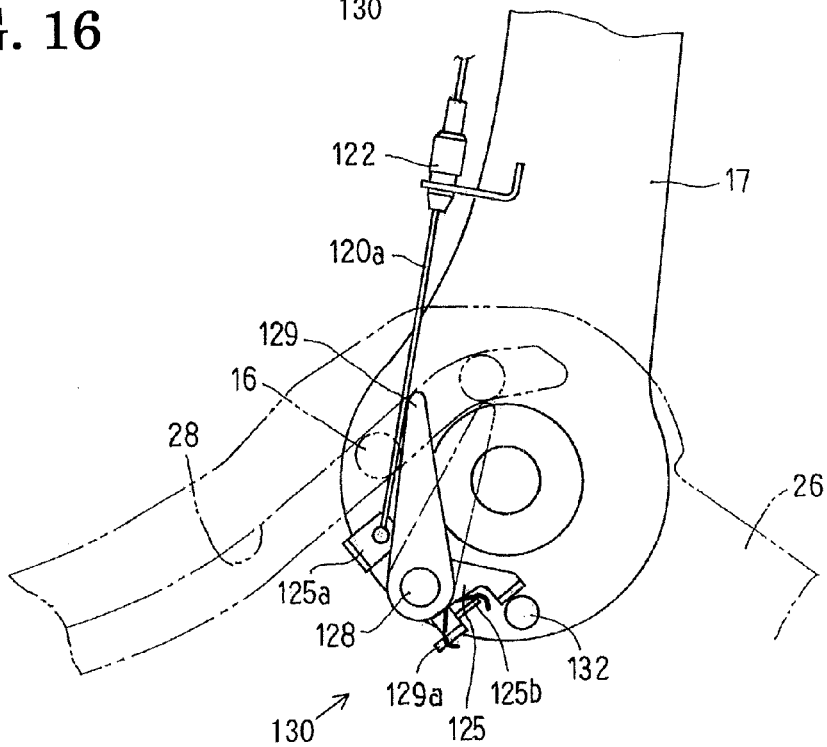
FIG. 16 is a view illustrating an operating state of the rotary member illustrated in FIG. 12.

In the case where the seat cushion 11 is moved from the retracted position to the seating position and the seat back 12 is moved from the forward-tilted position to the standing position, after the slide member 16 is moved forward along the guide groove 28 to a predetermined position, the slide member 16 makes contact with a rear surface of the pivot link 129 supported by the seat back frame 17 and the pivot link 129 is rotated clockwise about the supporting shaft 128, as seen in FIG. 16. At this time, the pivot link 129 only is rotated relative to the operating arm 125 against the biasing force of the second torsion spring 133 arranged between the operating arm 125 and the pivot link 129. Then, the slide member 16 is moved further forward close to the front end portion of the guide groove 28 and therefore is separated from the pivot link 129, thereafter being moved to the front end portion of the guide groove 28. Accordingly, the pivot link 129 is returned to the initial position shown in FIG. 12 by means of the biasing force of the second torsion spring 133.

After the seat cushion 11 is returned from the retracted position to the seating position and the seat back 12 is returned from the forward-tilted position to the standing position as described above, the head rest 110 is returned to the stationary position against the biasing force of the tension spring 112 by the occupant to engage the engagement portion 113 of the head rest 110 with the restriction cam 114; therefore, the head rest 110 is retained in the stationary position.

According to the configuration of the aforementioned embodiment, the pivot link 129 pivotably supported by the seat back frame 17 is rotated along with the operating arm 125 in accordance with the movement of the slide member 16 caused by the rearward movement of the seat 10. As a result, the head rest retaining device 116 is operated by the interlocking cable 120, thereby releasing the head rest 110 from the retained position and tilting forward the head rest 110 to the front side of the seat back 12 by means of the biasing force of the spring 112. Then, the head rest 110 is retained in the retracted position.

Thus, the head rest 110 may be moved from the stationary position to the retracted position in conjunction with the retracting operation of the seat 10 without an additionally special drive source. Further, the interference between the head rest 110 and the front seat at the time of the retracting operation of the seat 10 is surely prevented.

In the aforementioned embodiment, the seat back 12 is rotated by the first electric motor 80 driven by the drive unit 5 and the seat cushion 11 is moved in the longitudinal direction by the second electric motor 100 driven by the drive unit 6. Alternatively, the seat 10 according to the embodiment may be applicable to a seat for a vehicle, which is equipped with the seat cushion 11 that is manually movable in the longitudinal direction and with the seat back 12 that is manually rotatable.

In addition, the configuration of the head rest retaining device 116 described in the aforementioned embodiment is only an example. Alternatively, as long as the head rest retaining device 116 releases the head rest 110 from the stationary position to thereafter tilt the head rest 110 to the retracted position in conjunction with the movement of the seat cushion frame 13, the head rest retaining device 116 may include any configuration.

Moreover, the configuration of the seat 10 is not limited to the aforementioned embodiment and may be varied as long as not departing from the intended purpose of the seat 10 according to the embodiment.

The seat 10 according to the embodiment is applicable to a vehicle including a rear seat that is retracted when being not in use, i.e. when the occupant is not seated in the rear seat.

Additionally, according to the seat 10 described in the afore-mentioned embodiment, even when the head rest 110 is unintentionally retracted by the occupant under the condition where the seat cushion 11 is retained in the seating position, the seat back 12 is prevented from being released from the standing position in conjunction with the retracting operation of the head rest 110, therefore increasing usability of the seat 10.

As described above, the head rest 110 retained in the stationary position by the head rest retaining device 116 is released by utilizing the movement of the seat cushion frame 13 from the seating position to the retracted position. As a result, the head rest 110 is moved from the stationary position to the retracted position in conjunction with the retracting operation of the seat 10 without the additionally special drive source. In addition, the interference between the head rest 110 and the front seat is surely prevented in the time of the retracting operation of the seat 10.

According to the aforementioned embodiment, the rotary member 130 includes the operating arm connected to the end portion of the interlocking cable 120 and the pivot link 129 arranged coaxially with the operating arm 125, pivotably supported by the operating arm 125 relative thereto, and rotated by contacting with the slide member 16. Further, the first torsion spring 131 arranged between the operating arm 125 and the seat back frame 17 biases the operating arm 125 relative to the seat back frame 17 in one direction (a clockwise direction in FIG. 12). The second torsion spring 133 arranged between the pivot link 129 and the operating arm 125 biases the pivot link 129 relative to the operating arm 125 in the other direction (a counterclockwise direction in FIG. 12).

Accordingly, in the case where the seat cushion frame 13 is moved from the seating position to the retracted position, the contact of the pivot link 129 with the slide member 16 allows the pivot link 129 to integrally rotate with the operating arm 125. At this time, the head rest 110 retained in the stationary position by the head rest retaining device 116 is released. Meanwhile, in the case where the seat cushion frame 13 is returned to the retracted position to the seating position, the pivot link 129 only is rotated relative to the operating arm 125 by the contact of the pivot link 129 with the slide member 16.

According to the aforementioned embodiment, the seat back frame 17 is driven by the first electric motor 80 to rotate between the standing position and the forward-tilted position. The seat cushion frame 13 is driven by the second electric motor 100 to reciprocate between the seating position and the retracted position.

Accordingly, the seat cushion frame 13 and the seat back frame 17 are prevented from interfering with each other depending on the control timing for each of the first and second electric motors 80 and 100.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat for a vehicle, comprising:
   a seat cushion frame adapted to be moved in a reciprocating manner between a seating position and a retracted position and to support a seat cushion;
   a seat back frame adapted to be rotated between a standing position and a forward-tilted position and to support a seat back;
   a head rest supported at an upper end portion of the seat back frame and movable between a stationary position and a retracted position;
   a pair of links provided at both end portions of the seat cushion frame in a lateral direction of the vehicle, one end of each link being adapted to be pivotably connected to a vehicle floor and the other end of each link connected to a front portion of the seat cushion frame;
   a guide member arranged at the vehicle floor and including a guide groove formed to extend between the seating position and the retracted position of the seat cushion frame;
   a slide member arranged at a rear end portion of the seat cushion frame and slidably engaging with the guide groove;
   a head rest retaining device retaining the head rest in the stationary position;
   a rotary member rotatably supported by the seat back frame and rotated by the slide member sliding along the guide groove of the guide member; and
   an interlocking device having a first end connected to the rotary member so that rotation of the rotary member moves the interlocking device and a second end connected to the head rest retaining device so that movement of the interlocking device moves the head rest retaining device to permit the head rest to move toward the retracted position of the head rest, and wherein movement of the seat cushion frame towards the retracted position rotates the rotary member and causes movement of the interlocking device which moves the head rest retaining device to release the head rest from the stationary position and allows the head rest to move toward the retracted position.

2. The seat according to claim 1, wherein the rotary member includes an operating arm connected to an end portion of the interlocking device and a pivot link arranged coaxially with the operating arm, pivotably supported by the operating arm relative thereto, and rotated by contacting with the slide member, and
   wherein a first biasing member arranged between the operating arm and the seat back frame biases the operating arm relative to the seat back frame in one direction and a second biasing member arranged between the pivot link and the operating arm biases the pivot link relative to the operating arm in the other direction.

3. The seat according to claim 1, wherein the seat back frame is driven by a first electric motor to rotate between the standing position and the forward-tilted position, and the seat cushion frame is driven by a second electric motor to reciprocate between the seating position and the retracted position.

4. The seat according to claim 2, wherein the seat back frame is driven by a first electric motor to rotate between the standing position and the forward-tilted position, and the seat cushion frame is driven by a second electric motor to reciprocate between the seating position and the retracted position.

5. A seat for a vehicle, comprising:
a seat cushion frame movable between a seating position and a retracted position, and configured to support a seat cushion;
a seat back frame rotatable between a standing position and a forward-tilted position, and configured to support a seat back;
a head rest supported at an upper end portion of the seat back frame and rotatable about a pivot shaft between a stationary position and a retracted position;
a pair of links each having a first end connectable to a vehicle floor and a second end connected to the front portion of the seat cushion frame;
a guide member including a guide groove extending between the seating position and the retracted position of the seat cushion frame;
a slide member at a rear end portion of the seat cushion frame and slidably engaging the guide groove;
a head rest retaining device which retains the head rest in the stationary position when the seat back frame is in the standing position;
a rotary member rotatably supported by the seat back frame and rotated by the slide member traversing the guide groove of the guide member;
an interlocking device arranged between the rotary member and the head rest retaining device, the interlocking device being operated when the rotary member rotates as a result of movement of the seat cushion frame toward the retracted position of the seat cushion frame to cause the head rest retaining device to release the head rest and allow the head rest to move toward the retracted position of the head rest; and
a head rest biasing member applying a biasing force to the head rest urging the head rest to rotate towards the retracted position.

* * * * *